United States Patent
Li

(10) Patent No.: US 7,277,537 B2
(45) Date of Patent: Oct. 2, 2007

(54) TONE, MODULATED TONE, AND SATURATED TONE DETECTION IN A VOICE ACTIVITY DETECTION DEVICE

(75) Inventor: Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 279 days.

(21) Appl. No.: 10/652,483

(22) Filed: Sep. 2, 2003

(65) Prior Publication Data

US 2005/0047586 A1   Mar. 3, 2005

(51) Int. Cl.
*H04M 3/00* (2006.01)
(52) U.S. Cl. ...................... 379/386; 704/213
(58) Field of Classification Search ................ 379/386
See application file for complete search history.

(56) References Cited

U.S. PATENT DOCUMENTS 6,526,378 B1 * 2/2003 Tasaki ................... 704/224
2004/0176062 A1 * 9/2004 Hsieh ..................... 455/221

* cited by examiner

*Primary Examiner*—Sinh Tran
*Assistant Examiner*—Walter F Briney, III
(74) *Attorney, Agent, or Firm*—Steven A. Shaw; W. James Brady; Frederick J. Telecky, Jr.

(57) ABSTRACT

In a voice activity detection (VAD) device a method for defining tone signals comprises defining a threshold for zero amplitude change, calculating a zero crossing rate of a signal, extracting a set of parameters from a plurality of duration periods of the signal, defining a tolerance threshold between the plurality of duration periods when a zero amplitude change occurs, calculating a maximum difference between the plurality of duration periods, and comparing the maximum difference with the threshold. The method is implemented in the International Telecommunications Union (ITU) recommendation G.729 Annex B VAD.

3 Claims, 3 Drawing Sheets

TONE, MODULATED TONE, AND SATURATED TONE DETECTION IN A VOICE ACTIVITY DETECTION DEVICE

CROSS-REFERENCE TO RELATED APPLICATIONS

None

FIELD OF THE INVENTION

The present invention relates generally to improving the silence compression scheme for voice activity detection in a digital transmission system in compliance with the International Telecommunications Union G.729 Annex B standard.

BACKGROUND OF THE INVENTION

The International Telecommunication Union (ITU) Recommendation G.729 Annex B describes a compression scheme for communicating information about the background noise received in an incoming signal when no voice is detected in the signal. This compression scheme is optimized for terminals conforming to Recommendation V.70. The teachings of ITU-T G.729 and Annex B of the Recommendation are hereby incorporated into this application by reference.

Conventional speech decoders use synthesized comfort noise to simulate the background noise of a communication link during periods when voice is not detected in the incoming signal. By synthesizing the background noise, little or no information about the actual background noise need be conveyed through the communication channel of the link. However, if the background noise is not statistically stationary (i.e., the distribution function varies with time), the simulated comfort noise does not provide the naturalness of the original background noise. Therefore it is desirable to occasionally send some information about the background noise to improve the quality of the synthesized noise when no speech is detected in the incoming signal.

An adequate representation of the background noise, in a digitized frame (i.e., a 10 ms portion) of the incoming signal, can be achieved with as few as fifteen bits, substantially fewer than the number needed to adequately represent a voice signal.

The G.729 recommendation provides voice activity detection (VAD), discontinuous transmission (DTX), and Comfort Noise Generator (CNG) algorithms. The output of the VAD module is either 1 or 0, indicating the presence or absence of voice activity respectively. If the VAD output is 1, the G.729 speech codec is invoked to encode the active voice frames. However, if the VAD output is 0, the DTX/CNG algorithms described herein are used to encode the non-active voice frames. Traditional speech coders and decoders use comfort noise to simulate the background noise in the non-active voice frames. If the background noise is not stationary, a mere comfort noise insertion does not provide the naturalness of the original background noise. Therefore it is desirable to intermittently send some information about the background noise in order to obtain a better quality when non-active voice frames are detected. The coding efficiency of the non-active voice frames can be achieved by coding the energy of the frame and its spectrum with as few as fifteen bits. These bits are not automatically transmitted whenever there is a non-active voice detection. Rather, the bits are transmitted only when an appreciable change has been detected with respect to the last transmitted non-active voice frame. At the decoder side, the received bit stream is decoded. If the VAD output is 1, the G.729 decoder is invoked to synthesize the reconstructed active voice frames. If the VAD output is 0, the CNG module is called to reproduce the non-active voiced frames.

FIG. 1 illustrates a half-duplex communication link conforming to Recommendation G.729 Annex B. At the transmitting side of the link, a VAD module 12 generates a digital output to indicate the detection of noise or voice in the incoming signal. An output value of one indicates the detected presence of voice and a value of zero indicates its absence. If the VAD 1 detects voice, a G.729 speech encoder 6 is invoked to encode the digital representation of the detected voice signal. However, if the VAD 12 does not detect voice, a Discontinuous Transmission/Comfort Noise Generator (noise) encoder 14 is used to code the digital representation of the detected background noise signal. The digital representations of these voice and background noise signals 7 are formatted into data frames containing the information from samples of the incoming signal taken during consecutive time periods. (e.g., frames can be formatted into 10 ms frame sizes). A noise encoder and voice encoder input frames into a bit stream, and the bit stream will transmit the frames into a communication channel.

At the decoder side, the received bit stream for each frame is examined to determine whether to invoke either the voice or noise decoder. The examination process for each frame includes an evaluation of the protocol and codec, frame or packet type, and length of a packet. If no packet arrives in the bit stream during a noise session, then a comfort noise packet is generated based on the most recent SID packet that arrived at the decoder side.

To make a determination of whether a frame contains voice or noise, the VAD 1 extracts and analyzes four parametric characteristics of the information within the frame. These characteristics are the full- and low-band energies, the set of Line Spectral Frequencies (LSF), and the zero cross (ZC) rate. A set of difference measures between the extracted characteristics of the current frame and the running averages of the background noise characteristics are calculated for each frame. The difference between the current frame and the running average represents the characteristics of the noise. Where small differences in characteristics are detected, the characteristics of the current frame are highly correlated to those of the running averages for the background noise and the current frame is more likely to contain background noise than voice. Where large differences are detected, the current frame is more likely to contain a signal of a different type, such as a voice signal.

An initial VAD decision regarding the content of the incoming frame is made using multi-boundary decision regions in the space of the four differential measures, as described in ITU G.729 Annex B. Thereafter, a final VAD decision is made based on the relationship between the detected energy of the current frame and that of neighboring past frames. This final decision step tends to reduce the number of state transitions.

The running averages have to be updated only in the presence of background noise, and not in the presence of speech. An adaptive update is as follows:

if (($E_f < \overline{E}_f + 3$ dB & RC (1)<0.75) or SD<0.0637) then update where $\overline{E}_f$ is average full band noise energy, RC (1) is the first reflection coefficient, and SD is spectral distance. Let $C_n$ be the total number of frames where the update condition was satisfied. $\overline{E}_f$ and $C_n$ are further updated according to:

$$\text{if (frame count} > N_0) \text{ and } (\overline{E}_f < E_{\min}) \begin{cases} \overline{E}_f = E_{\min} \\ C_n = 0 \end{cases}$$

As recited in ITU recommendation G.729B, the normalized zero crossing rate is given by equation (B.3), as recited below:

$$ZC = \frac{1}{2M} \times \sum_{i=0}^{M-1} [|\text{sgn}(x(i)) - \text{sgn}(x(i-1))|],$$

where x(i) is the pre-processed input signal.

G.729B recommends using the first thirty-two frames to initialize the average and calculate the line spectral frequencies (LSF), full band energy, low band energy, and zero crossing rate. The average spectral parameters of the background noise, denoted by $\{LSF_{avg}\}$, are initialized as an average of the line spectral frequencies of the frames, the average of the background noise zero crossing rate, denoted by $ZC_{avg}$ is initialized as an average of the zero crossing rate, ZC, and the average full and low band energies of the frames. If the frame contains voice or tone packets during the initialization instead of noise, the G.729B VAD recommended solution can fail to detect any noise during voice or tone signal transmissions due to problems associated with measuring the samples at the zero crossing, resulting in poor performance of the voice activity detector. The G.729B recommended standard calculates the zero crossing rate based upon the multiplication of consecutive signals. If the sample point is at a zero crossing point, the calculations cannot count the point as a zero crossing because the sample has a zero amplitude and a tone signal will be detected as noise, causing errors in a voice activity detector. Therefore, as long as there is a zero amplitude in the signal, the same problem arises and the recommended calculations cannot measure the signal at the zero crossing point.

Without some modification to the recommendation in G.729B, when the recommended algorithm counts samples for the zero crossing rate, it will not count a sample whose amplitude is zero, resulting in an inaccurate zero crossing rate calculation. Therefore, what is needed is a method for correcting the errors associated with calculating a zero crossing rate for a voice activity detector and a method to detect tone signals based upon the correct zero crossing rate.

SUMMARY

In a first aspect of an exemplary embodiment, a method for defining tone signals in a voice activity detection (VAD) device includes defining a threshold for zero amplitude change, calculating a zero crossing rate of a signal, extracting a set of parameters from a plurality of duration periods of the signal, defining a tolerance threshold between the plurality of duration periods when a zero amplitude change occurs, calculating a maximum difference between the plurality of duration periods, comparing the maximum difference with the threshold. In a further aspect of an exemplary embodiment, the method includes calculating the zero crossing rate by determining, for a signal sample with a zero value amplitude at the zero crossing point, a tangent value of the sample and defining the zero value amplitude as a non-zero value depending upon the tangent of the sample point.

In yet another aspect of an exemplary embodiment, the method includes defining the zero value amplitude according to whether the tangent is positive or negative. In another aspect, the method includes calculating a product between the sample and the sample's adjacent sample in a group of signal samples. In yet a further aspect, the method includes defining a range of said signal that does not contain a zero crossing point and comparing the range with the threshold. In yet a further aspect, the method includes calculating the maximum difference between a sum of all the durations and a single duration. In still another aspect, the method includes calculating the maximum difference using a mean difference between a sum of all durations and a single duration.

The exemplary embodiment is also applicable to voice activity detection device constructed according to the International Telecommunications Union (ITU) recommendation G.729 Annex B.

BRIEF DESCRIPTION OF THE DRAWINGS

Preferred embodiments of the invention are discussed hereinafter in reference to the drawings, in which.

DETAILED DESCRIPTION OF PREFERRED EMBODIMENTS

To solve the problems associated with calculating the zero crossing rate in a voice activity detection device according to International Telecommunications Union (ITU) Recommendation G.729 Annex B (G.729B), the following method corrects the errors associated with a zero crossing rate calculation and detects tones in a signal based upon the corrected zero crossing rate.

Figure 1:
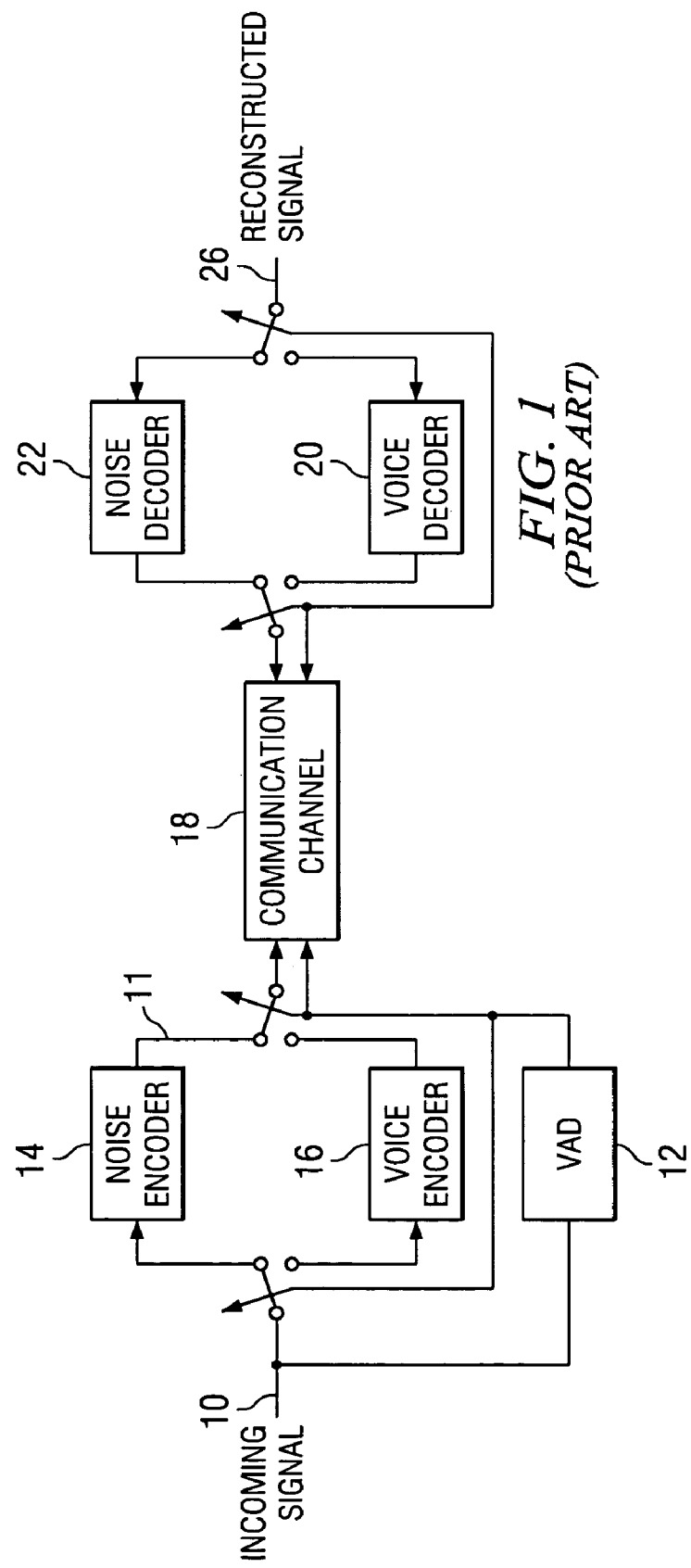
FIG. 1 illustrates a half-duplex communication link conforming to Recommendation G.729 Annex B.
Figure 2:
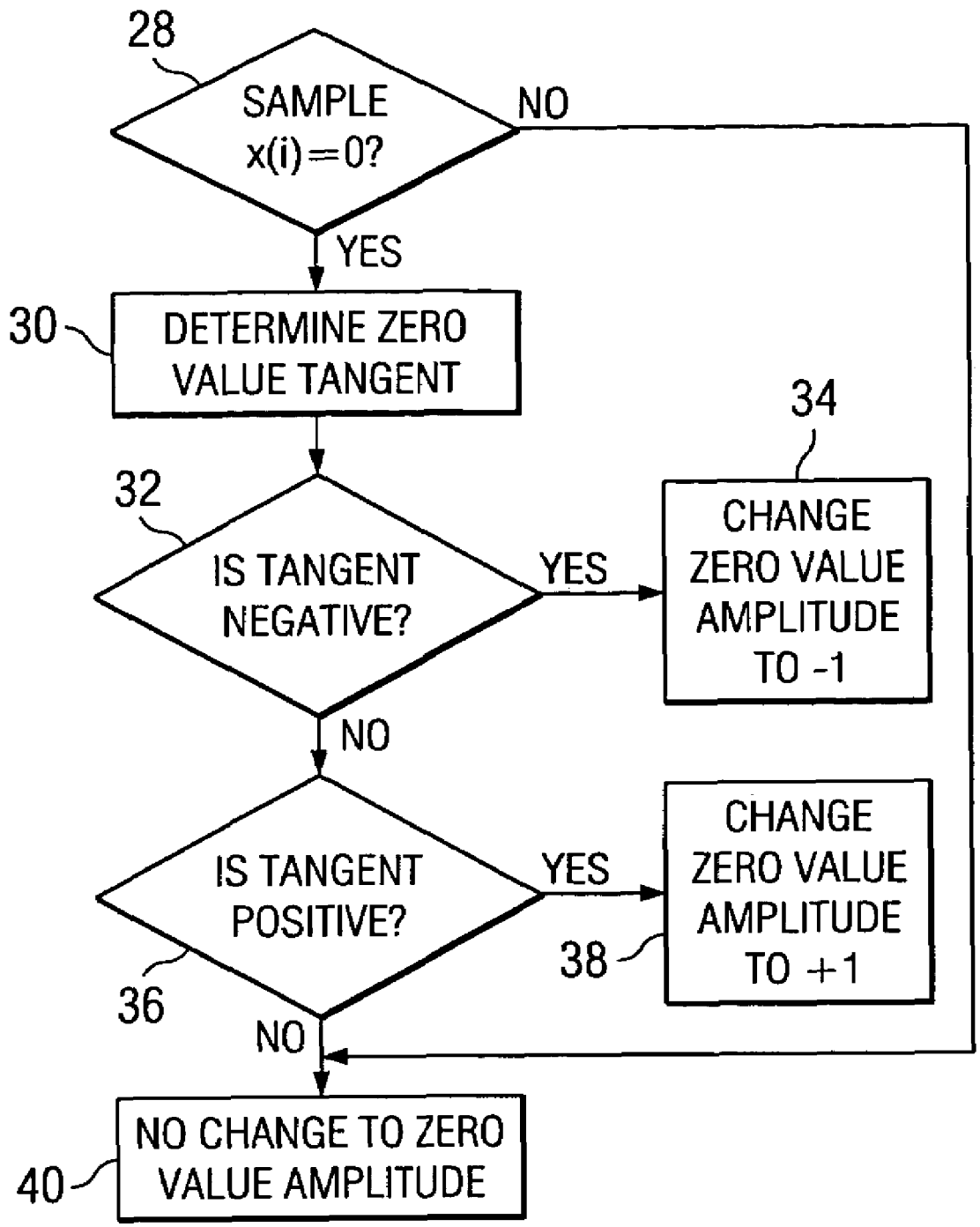
FIG. 2 illustrates the process flow for defining a signal amplitude at a zero crossing point under G.729 Annex B.

FIG. 2 is a block diagram illustrating an exemplary embodiment of the logic flow of the preferred embodiment to determine if a change in the zero value of a sample is necessary. Prior to determining the zero value, an input signal 10 passes to VAD 12 which extracts the parametric feature of the frame zero crossing rate (ZCR) from the signal 10 for use in the G.729B tone detection algorithm. The ZCR is calculated for every frame in the VAD module 10. A digital signal sample point may have a zero value at a crossing point, and therefore the G.729B algorithm may overlook or miscalculate the zero samples.

Referring to block 28, a sample is analyzed to determine if the amplitude of a signal sample x(i) is zero at the zero value (28). If the value is not zero, then no change in the zero value amplitude 40. If the zero value amplitude of sample x(i) is equal to zero, then the method determines a tangent at a zero amplitude point on the signal wave 30. Each signal must cross the zero point at either a positive, negative, or zero tangent to horizontal. The zero crossing point is analyzed to determine if the crossing occurs on the downslope of a signal, meaning that the tangent is negative 32. If the tangent is negative, the signal amplitude is changed from zero to negative one (34). If the tangent is not negative, the signal is analyzed to determine if the zero crossing point occurs on a rising tangent of the signal (e.g., if the tangent is positive 36). If the tangent at the zero crossing is positive, then the signal amplitude for the crossing point is changed to positive one (38).

A third case can occur when the signal has neither a positive or negative slope (e.g., has a zero tangent) at the zero crossing. If the algorithm determines that the signal tangent at the zero crossing is neither positive or negative, then the amplitude value remains at zero (40).

The following method formulates this aspect of the exemplary embodiment:

$$\text{sine}(x) = \begin{cases} -1 & \text{if } x < 0 \\ 1 & \text{if } x > 0 \\ 0 & \text{if } x = 0 \end{cases}$$

wherein x is the slope of the signal at the zero crossing point.

The zero crossing rate is then calculated as a summation. First, the product is calculated between each sample and the sample's next adjacent sample. The number of zero crossings are equal to the number of negative products. Accordingly, in the following equation, y(n) is defined according to the sign of x, where n is a sample point:

$$y(n) = \begin{cases} 1 & \text{if } \text{sign}(x(n) \cdot x(n-1)) < 0 \\ 0 & \text{if } \text{sign}(x(n) \cdot x(n-1)) \geq 0 \end{cases}$$

The ZCR can then be calculated as $$ZCR = \frac{\sum_{n=1}^{f_{size}} y(n)}{f_{size}}$$

where $f_{size}$ represents the frame size. Therefore, the zero crossing rate is the sum of zero crossings for a particular frame divided by the frame size.

Figure 3:
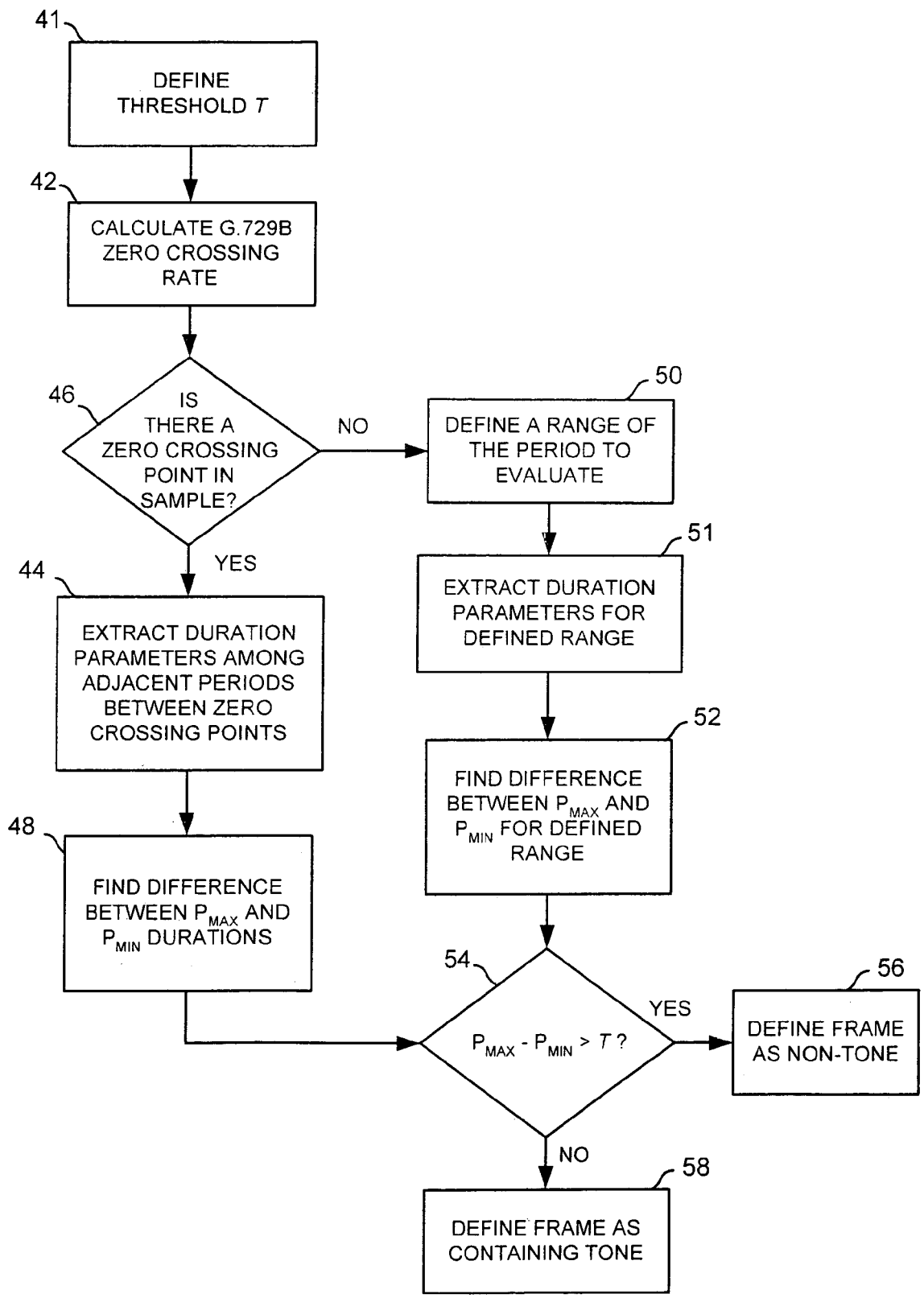
FIG. 3 illustrates the process flow for determining whether a frame is defined as containing tone under G.729 Annex B.

Durations between zero crossing points is considered a tone detection parameter. In the preferred embodiment, a difference between durations for a sequence of durations in a frame is calculated and compared with a threshold. FIG. 3 illustrates an exemplary logical flow chart of the preferred embodiment for finding the durations between adjacent negative products and determining if a sample contains a tone or non-tone signals. For signals containing tone, which includes saturated and modulated tones, the duration between two zero crossing points should theoretically be constant. The frequency of the sample should remain constant even though amplitude of the sample may change. However, because of the resolution of digital sampling and the changes of the zero amplitude, the durations may vary in size between samples.

Referring to FIG. 3, block 41 illustrates where a threshold T is defined for comparison against a sum of durations between zero crossing points to the threshold to determine whether a frame contains tone data. Exemplary thresholds include a threshold of one if there is no zero amplitude change and a threshold of two if there is a zero amplitude change. The zero crossing rate is then calculated according to the G.729B recommendation 42, wherein the product is calculated between each sample and the sample's next adjacent sample. The number of zero crossings may be equal to the number of negative products. Next, the method extracts duration parameters among adjacent periods between zero crossing points 44, 51. A duration is the signal period between two zero crossing points of the signal. Here, the durations between adjacent negative products of zero crossings are calculated. For tone signals which include saturated tones and modulated tones, the durations should be constant. As described herein, a sequence of durations is used to calculate the difference between a summed mean of duration periods and the duration of a single frame.

As stated previously, the parameters are analyzed to determine if there is a zero amplitude change 46. If there is a zero amplitude change, a tolerance threshold is defined between duration periods. If there is no zero amplitude change, then the signal does not contain a zero crossing point 46. At such a determination, a range of the signal 50 is defined to compare to the threshold 41. At the next step in the process, either the duration or the range is compared with the threshold 52. The method then determines if the maximum difference between durations ($P_{MAX}$-$P_{MIN}$) 48,52 is greater than the threshold 54, the frame if defined as a non-tone frame 56. In an exemplary embodiment, the maximum difference between all durations is calculated. In the modification of the G.729B algorithm shown below, the tone_flag parameter for a non-tone frame is set to zero. However, if the maximum difference between durations 54 is not greater than a threshold, then the frame is defined as a tone frame 58. In the modification of the G.729B algorithm shown below, the tone_flag parameter for a frame containing tone is set to one.

Signal periods without a zero crossing point must have a range of the period selected 50 to compare against a threshold. For example, if a low frequency signal or DC offset has no crossing points, only a range of the signal without any crossing points is compared to a threshold. In block 54, if the range of the signal without crossing points greater than a threshold, then the frame is defined as a non-tone frame 56. However, where the range of the signal is defined as not greater than a threshold, then the frame is defined as containing tone data 58.

The following equation determines the mean difference between all durations m of a frame, as follows:

$$\sum_{j=1}^{m}\left|\frac{1}{m}\sum_{i=1}^{m}Pi-Pj\right|$$

where Pi and Pj are adjacent zero crossing durations in the frame sequence. The sum of all mean differences are then summed for the number of durations.

In modifying the G.729 Annex B VAD algorithm, the G.729B VAD has to be changed in order to improve its performance on tone related signals in initialization and voice activity decision smoothing. In the initialization duration, tone flags are added in the following logic to remove tone frames mean vectors:

```
if (sub(*frm_count, INIT_FRAME) <= 0){
    if(sub(ENERGY, 3072) < 0){
        *marker = NOISE;
        less_count++;
    }
    else{
        *marker = VOICE;
        if (tone_flag){
            less_count++;
        }
        else {
            acc0 = L_deposit_h(MeanE);
            acc0 = L_mac(acc0), ENERGY, 1024);
            MeanE = extract_h(acc0);
            acc0 = L_deposit_h(MeanSZC);
            acc0 = L_mac(acc0, ZC, 1024);
            MeanSZC = extract_h(acc0);
            for (i=0; i<M; i++){
                acc0 = L_deposit_h(MeanLSF[i]);
                acc0 = L_max(acc0, lsf[i], 1024);
                MeanLSF[i] = extract_h(acc0);
            }
        }
    }
}
```

The tone flag is also used for modification in voice activity decision smoothing according to the following logic:

```
if(tone_flag!=1 && (sub(sub(ENERGY, 614), MeanSE) < 0)
   && (sub(*frm_count, 128) > 0) && (!v_flag) && (sub(rc, 19661) < 0))
   *marker = NOISE;
```

In implementing the system of the present invention, the various parameters may be adjusted to correspond to the signal, the equipment used in the digital network, and the desired tradeoff between precise tone detection in G.729B and processing resources of the system that are available for the calculations. Advantages in implementing the present invention include the robustness of the supplemental algorithm and the efficient use of processing resources (e.g., MIPS or millions of instructions per second) within a processor that is executing the VAD module.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A method for defining tone signals in a voice activity detection (VAD) device, comprising:
    defining a threshold for zero amplitude change by determining, for a signal with a zero value amplitude at a zero crossing point, a tangent value of the signal, and by defining the zero value amplitude as a non-zero value depending upon the tangent of said signal at the zero crossing point;
    calculating a zero crossing rate of a signal;
    extracting a set of parameters from a plurality of duration periods of said signal;
    calculating a maximum difference between said plurality of duration periods;
    comparing said maximum difference with said threshold; and
    declaring a sample of the signal as containing a tone when the maximum difference is not greater than the threshold;
    wherein said defining comprises defining the threshold as one if the signal has no zero amplitude change, and defining the threshold as two if the signal has a zero amplitude change.

2. A method for defining tone signals in a voice activity detection (VAD) device, comprising:
    defining a threshold for zero amplitude change by determining, for a signal with a zero value amplitude at a zero crossing point, a tangent value of the signal, and by defining the zero value amplitude as a non-zero value depending upon the tangent of said signal at the zero crossing point;
    calculating a zero crossing rate of a signal;
    extracting a set of parameters from a plurality of duration periods of said signal;
    calculating a maximum difference between said plurality of duration periods;
    comparing said maximum difference with said threshold; and
    declaring a sample of the signal as containing a tone when the maximum difference is not greater than the threshold;
    wherein the calculating the zero crossing rate comprises:
    analyzing the sample to determine if an amplitude of a signal sample is zero at a zero crossing point;
    when the amplitude is zero at the zero crossing point, determining a tangent of a signal wave of the signal sample at the zero crossing point;
    changing the signal amplitude from zero to negative one if the tangent is negative; and
    changing the signal amplitude from zero to positive one if the tangent is positive.

3. A device for defining tone signals for voice activity detection (VAD), comprising:
a processor that is programmed to;
define a threshold for zero amplitude change;
calculate a zero crossing rate of a signal;
extract a set of parameters from a plurality of duration periods of said signal;
calculate a maximum difference between said plurality of duration periods; and
compare said maximum difference with said threshold
calculating a zero crossing rate wherein the signal has a zero amplitude change at a zero crossing by:
analyzing the sample to determine if an amplitude of a signal sample is zero at a zero crossing point;
when the amplitude is zero at the zero crossing point, determining a tangent of a signal wave of the signal sample at the zero crossing point;
changing the signal amplitude from zero to negative one if the tangent is negative; and
changing the signal amplitude from zero to positive one if the tangent is positive.

* * * * *